(12) United States Patent
Zhang et al.

(10) Patent No.: US 11,804,316 B2
(45) Date of Patent: Oct. 31, 2023

(54) UNDERWATER UMBILICAL CABLE WHICH IS CAPABLE OF TEMPERATURE AND VIBRATION MEASURING AND THREE-DIMENSIONAL SHAPE RECONSTRUCTION

(71) Applicant: Nanjing University, Jiangsu (CN)

(72) Inventors: Yixin Zhang, Jiangsu (CN); Fei Xiong, Jiangsu (CN); Xuping Zhang, Jiangsu (CN); Chi Zhang, Jiangsu (CN); Long Chen, Jiangsu (CN); Shun Wang, Jiangsu (CN); Xiaohong Chen, Jiangsu (CN); Feng Wang, Jiangsu (CN)

(*) Notice: Subject to any disclaimer, the term of this patent is extended or adjusted under 35 U.S.C. 154(b) by 0 days.

(21) Appl. No.: 17/841,416

(22) Filed: Jun. 15, 2022

(65) Prior Publication Data

US 2023/0154653 A1 May 18, 2023

(30) Foreign Application Priority Data

Nov. 12, 2021 (CN) .......................... 202111339441.0

(51) Int. Cl.
*G01K 11/32* (2021.01)
*G02B 6/44* (2006.01)
*H01B 11/22* (2006.01)
*G01L 1/24* (2006.01)

(52) U.S. Cl.
CPC .............. *H01B 11/22* (2013.01); *G01K 11/32* (2013.01); *G01L 1/242* (2013.01); *G02B 6/4427* (2013.01)

(58) Field of Classification Search
None
See application file for complete search history.

(56) References Cited

U.S. PATENT DOCUMENTS

| | | | | |
|---|---|---|---|---|
| 2016/0146699 A1* | 5/2016 | Lally | ..................... | G01D 18/00 356/73.1 |
| 2016/0370177 A1* | 12/2016 | Laine | ..................... | G01B 11/16 |
| 2020/0132926 A1* | 4/2020 | Kashyap | .............. | G02B 6/4415 |
| 2021/0116265 A1* | 4/2021 | Tadakuma | .......... | G01B 11/161 |
| 2022/0049950 A1* | 2/2022 | Van Dusschoten | .... | G02B 6/022 |

FOREIGN PATENT DOCUMENTS

GB    2567406 A  *  4/2019  ............. G01L 1/242

* cited by examiner

*Primary Examiner* — Chris H Chu

(57) ABSTRACT

The invention discloses an underwater umbilical cable which is capable of temperature and vibration measuring and three-dimensional shape reconstruction, wherein underwater umbilical cable is used to connect underwater equipment and aquatic equipment; the underwater umbilical cable comprises an outer sheath, armored steel wires, an inner sheath, a power cable, a communication optical cable, a steel pipe, three strain measuring optical fibers, three temperature measuring optical fibers, a distributed optical fiber strain interrogator, a distributed optical fiber temperature interrogator and a processor. The invention can collect the operation status data of the umbilical cable for a long time. The collected data is highly objective, can truly reflect the real-time operation status of the umbilical cables, and plays an important role in guaranteeing the long-term submarine oil and gas exploitation.

6 Claims, 1 Drawing Sheet ated by 120°.
UNDERWATER UMBILICAL CABLE WHICH IS CAPABLE OF TEMPERATURE AND VIBRATION MEASURING AND THREE-DIMENSIONAL SHAPE RECONSTRUCTION

TECHNOLOGY FIELD

The invention relates to optical fiber sensing technology, in particular to an underwater umbilical cable which is capable of temperature and vibration measuring and three-dimensional shape reconstruction.

BACKGROUND ART

In deep-sea oil and gas development, underwater production systems are widely used because of their adaptability to various floating platforms and related sea conditions, efficient and economical exploitation methods, and relatively mature technologies. The underwater production system installs production equipment such as production trees on the seabed, it is a development and production mode that can effectively improve production reliability and save platform maintenance costs, and is mainly composed of subsea production equipment, upper control module, and umbilical cable.

Subsea production system is the main development mode of deepwater oil and gas fields. The umbilical cable, as the "lifeline" connecting the topside facilities and the underwater production system, provides the hydraulic power source for the valve actuator of the underwater production system, provides the power supply for the underwater control system; and provides the control signal and transmission operation status data for the underwater production system; provides chemical injection channels for subsea wells, etc.

In traditional underwater production systems, the role of optical fibers is generally only used for communication, and some modules have been added for temperature and stress measurement. However, it simply measures the temperature and vibration around the umbilical cable, and does not have the ability to three-dimensionally reshape and map the water temperature of the specific depth of the seawater according to the three-dimensional shape of the umbilical cable, thereby it is impossible to identify the specific underwater depth.

As shown in FIG. 2, when the umbilical cable is deployed, it is subjected to large tensile loads, bending loads and periodic alternating loads due to factors such as own weight, waves, ocean currents, and floating body motion. And in the process of long-term use, due to the corrosion of seawater, the umbilical cable will gradually age, and if it is not repaired in time, it may lead to serious consequences of short circuit. And there are many fish on the seabed, the umbilical cable is at the risk of fish biting. Therefore, during the long-term operation, the status of the umbilical cable is monitored in real time, which can preventing the umbilical cable from being damaged, and causing a significant economic loss. The use of distributed optical fiber sensing technology to monitor the operation status of the umbilical cable in real time plays an important role in ensuring the long-term normal operation of the umbilical cables.

SUMMARY OF THE INVENTION

In order to overcome the deficiencies in the prior art, the invention provides an underwater umbilical cable which is capable of temperature and vibration measuring and three-dimensional shape reconstruction, which can collect the operation status data of the umbilical cable for a long time. The collected data is highly objective, can truly reflect the real-time operation status of the umbilical cable, and plays an important role in guaranteeing the long-term submarine oil and gas exploitation.

To achieve the above purposes, the invention adopts the following technical scheme:

On the one hand, the embodiment of the invention provides an underwater umbilical cable which is capable of temperature and vibration measuring and three-dimensional shape reconstruction, wherein underwater umbilical cable is used to connect underwater equipment and aquatic equipment; the underwater umbilical cable comprises an outer sheath, armored steel wires, an inner sheath, a power cable, a communication optical cable, a steel pipe, three strain measuring optical fibers, three temperature measuring optical fibers, a distributed optical fiber strain interrogator, a distributed optical fiber temperature interrogator and a processor; the power cable is used to provide the working voltage required for the normal operation of the underwater equipment; the communication optical cable is used to establish a communication link between the underwater equipment and the aquatic equipment;

the outer sheath is concentrically sleeved on the outside of the inner sheath, a first gap with an annular cross-section is formed between the two, and a plurality of armored steel wires are evenly filled in the first gap;

the power cable, the communication optical cable, the steel pipe, strain measuring optical fibers, temperature measuring optical fibers are circumferentially distributed in the inner sheath; three strain measuring optical fibers and three temperature measuring optical fibers respectively constitute three detection optical fiber arrays, and the strain measuring optical fiber and the temperature measuring optical fiber of each detection optical fiber array are closely attached in the same cavity; the power cables, communication optical cables, and steel pipes are respectively arranged in second gap among the detection optical fiber arrays; other spaces in the second gap are filled with fillers;

the distributed optical fiber strain interrogator is respectively connected with three strain measuring optical fibers, and is used to process and analyze the reflected light of the three strain measuring optical fibers, locate the deformation point and deformation degree of the strain measuring optical fibers, restore the shape of the umbilical cables, and obtain correspondence between cable length and depth;

the distributed optical fiber temperature interrogator is used to process and analyze the reflected light obtained by the three temperature measuring optical fibers, and to monitor the temperature changes of the optical fibers in real time;

the processor is used to control the working state of the underwater equipment, and to display the temperature along the umbilical cable and the three-dimensional shape of the umbilical cable.

Further, the three detection optical fiber arrays are separated by 120°.

Further, the strain measuring optical fibers are three-in-one single-mode optical fibers, three single-core optical fibers are integrated in one cavity, and the three single-core optical fibers are separated by 120° respectively.

Further, the temperature measuring optical fibers adopt loose sleeve single-mode optical fibers.

Further, the underwater umbilical cable comprises storage device used to store the reflected light obtained by strain measuring optical fibers and temperature measuring optical fibers.

On the other hand, the invention provides an operating method of underwater umbilical cable which is capable of temperature and vibration measuring and three-dimensional shape reconstruction, the operating method comprises the following steps:

S1, choose the length of umbilical cable according to the depth of the water;

S2, connect the upper production control module and the lower production equipment with umbilical cable, in which the optical fiber is connected with a flange; the power cable is connected with industrial electricity;

S3, demodulate the data returned by the temperature measuring optical fibers in real time, and performs temperature compensation on the strain measuring optical fiber according to the demodulation results;

S4, obtain the bending conditions of the umbilical cable at different lengths by calculating the data of the three strain measuring optical fibers, reconstruct the shape of the umbilical cable, and obtain the correspondence between the cable length and depth;

S5, according to the correspondence between cable length and depth, map the temperature anomaly, vibration anomaly, and morphological anomaly to the corresponding depths.

The advantageous effects of the invention:

(1) There is no integrated temperature-measuring, vibration-measuring and strain measuring optical fibers inside the traditional umbilical cables, which only extends the production process of the umbilical cables, and there was an inability to locate the depth at which the problem occurred and to monitor the posture of the umbilical underwater.

(2) The optical fiber integrated in the traditional umbilical cable is only used to simply measure the temperature around the cable and the vibration around the cable, and the temperature-measuring optical fibers and the strain measuring optical fibers are deployed and used separately, and the temperature-measuring data is not used to compensate the strain measuring data. The strain measuring optical fibers in the invention adopt loose sleeve single-mode optical fibers which is not affected by stress when measuring temperature to compensate the optical fibers, and the temperature-measuring optical fibers and the strain measuring optical fibers are closely attached together.

(3) The strain measuring optical fibers are designed to be separated by 120°, according to the data of the three strain measuring optical fibers, the twisting direction of the umbilical cables can be reconstructed, and the underwater shape thereof can be reshaped, thereby the mapping relationship between the length of the umbilical cable and the water depth can be analyzed. With the temperature-measuring optical fibers, the temperature at specific depth of water can be obtained.

(4) The strain measuring optical fibers adopt optical fiber cavity composed of three single-core optical fibers, which overcomes the crosstalk and fan-out problems of each fiber core in a multi-core fiber distributed sensor, as well as the resulting sensor sensitivity reduction problem.

BRIEF DESCRIPTION OF ACCOMPANYING DRAWINGS

SPECIFIC EMBODIMENTS OF THE INVENTION

The invention is further described in detail with the accompanying drawings.

It should be noted that the terms such as "upper", "lower", "left", "right", "front", "rear", etc., quoted in the invention are only for the convenience of description and clarity, and are not used for limiting the applicable scope of the invention, the change or adjustment of the relative relationship shall be regarded as the applicable scope of the invention without substantially changing the technical content.

Embodiment 1

Figure 1:
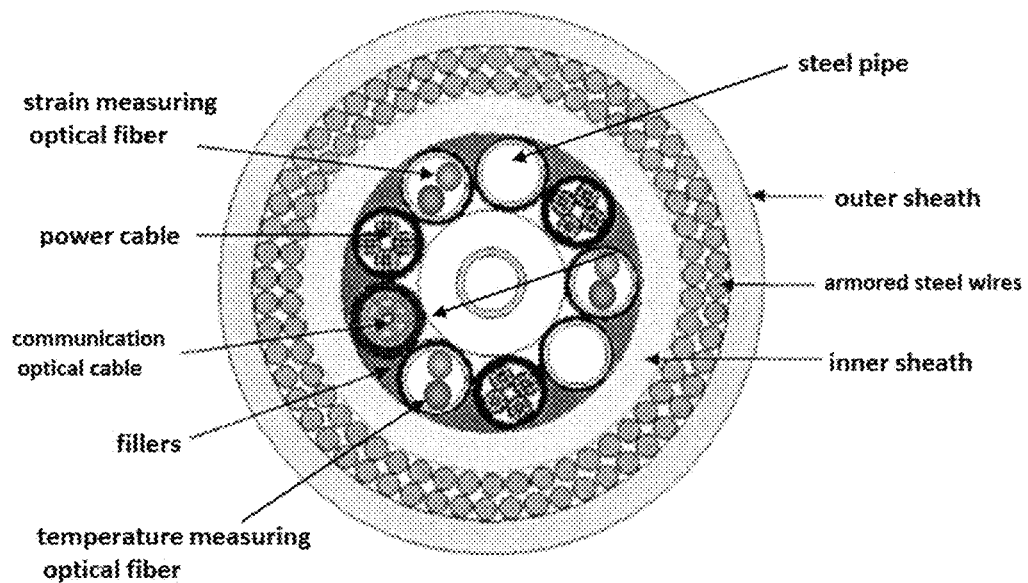
FIG. 1 shows the structure of underwater umbilical cable which is capable of temperature and vibration measuring and three-dimensional shape reconstruction in the embodiment of the invention.
Figure 2:
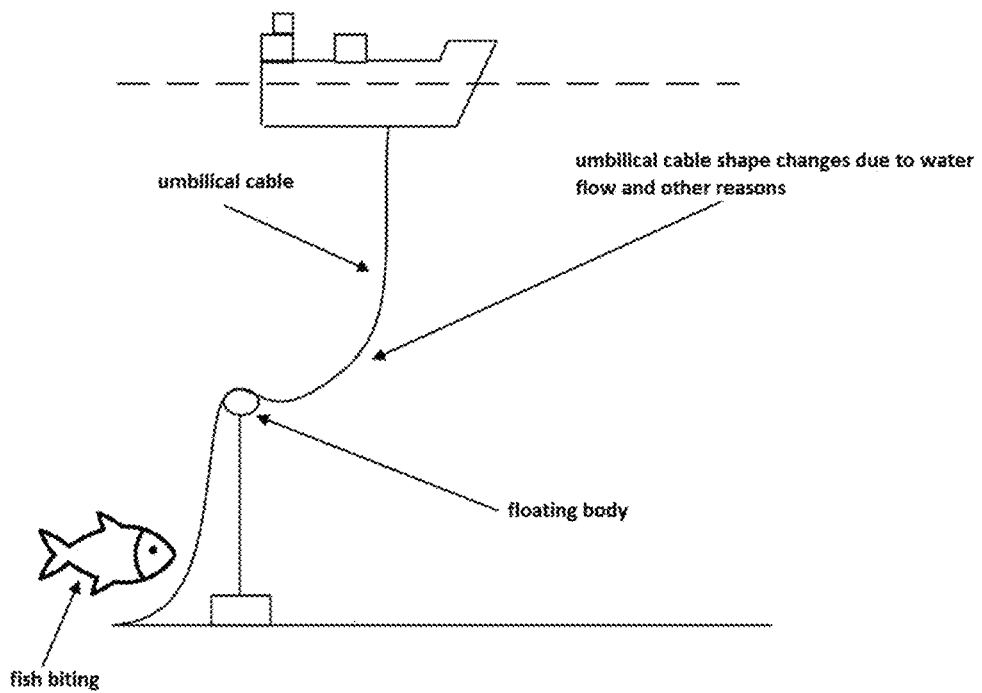
FIG. 2 shows damage principle of underwater umbilical cable.

FIG. 1 shows the structure of underwater umbilical cable which is capable of temperature and vibration measuring and three-dimensional shape reconstruction in the embodiment of the invention. The underwater umbilical cable is used to connect underwater equipment and aquatic equipment; the underwater umbilical cable comprises an outer sheath, armored steel wires, an inner sheath, a power cable, a communication optical cable, a steel pipe, three strain measuring optical fibers, three temperature measuring optical fibers, a distributed optical fiber strain interrogator, a distributed optical fiber temperature interrogator and a processor; the power cable is used to provide the working voltage required for the normal operation of the underwater equipment; the communication optical cable is used to establish a communication link between the underwater equipment and the aquatic equipment.

The outer sheath is concentrically sleeved on the outside of the inner sheath, a first gap with an annular cross-section is formed between the two, and a plurality of armored steel wires are evenly filled in the first gap; the power cable, the communication optical cable, the steel pipe, strain measuring optical fibers, temperature measuring optical fibers are circumferentially distributed in the inner sheath; three strain measuring optical fibers and three temperature measuring optical fibers respectively constitute three detection optical fiber arrays, and the strain measuring optical fiber and the temperature measuring optical fiber of each detection optical fiber array are closely attached in the same cavity; the power cables, communication optical cables, and steel pipes are respectively arranged in second gap among the detection optical fiber arrays; other spaces in the second gap are filled with fillers;

In the embodiment, the umbilical cable sheath (including the outer sheath and the inner sheath) is used to protect optical fibers, power cables and other structures. The umbilical cable connects underwater equipment and aquatic equipment, the upper end thereof is connected to production control module, and the lower end thereof is connected to subsea production equipment, which realizes the control of production information and supply under the sea, and provides energy and power for the subsea manifold system, and transmits control signals to the lower equipment transmits sensor data to the upper production module.

The distributed optical fiber strain interrogator is respectively connected with three strain measuring optical fibers, and is used to process and analyze the reflected light of the three strain measuring optical fibers, locate the deformation point and deformation degree of the strain measuring optical fibers, restore the shape of the umbilical cables, and obtain correspondence between cable length and depth. The distributed optical fiber temperature interrogator is used to process and analyze the reflected light obtained by the three temperature measuring optical fibers, and to monitor the temperature changes of the optical fibers in real time. Exemplarily, the distributed optical fiber strain interrogator and the distributed optical fiber temperature interrogator can use the Brillouin Optical Time-Domain Analysis (BOTDA) based on stimulated Brillouin scattering or the Phase-sensitive Optical Time-Domain Reflection (φ-OTDR).

The processor is used to control the working state of the underwater equipment, and to display the temperature along the umbilical cable and the three-dimensional shape of the umbilical cable.

As one of the preferred embodiment, the strain measuring optical fibers in the invention adopt loose sleeve single-mode optical fibers which is not affected by stress to measure temperature for light transmission, which has good toughness, high strength and low loss, and can accurately detect the temperature change of the umbilical cables.

As one of the preferred embodiment, the strain measuring optical fibers are three-in-one single-mode optical fibers, three single-core optical fibers are integrated in one cavity, and the three single-core optical fibers are separated by 120° respectively, which overcomes the crosstalk and fan-out problems of multi-core optical fibers, and improves sensor sensitivity.

Exemplarily, the underwater umbilical cable comprises storage device used to store the reflected light obtained by strain measuring optical fibers and temperature measuring optical fibers.

In this embodiment, a temperature measuring optical fibers and a strain measuring optical fibers are integrated into the umbilical cable, and the two types of optical fibers are closely attached, each with three optical fibers, which are separated by 120°. The temperature measuring optical fibers performs temperature compensation on the strain measuring optical fibers, and the two optical fibers are closely attached together. Both temperature and deformation will cause changes in the optical phase, and both temperature and deformation are obtained by phase demodulation, the temperature of the strain measuring optical fibers can be measured by closely attaching the temperature-measuring optical fibers to the strain measuring optical fibers, and then the effect of phase change caused by temperature change can then be removed.

Embodiment 2

The embodiment of the invention provides an operating method of underwater umbilical cable which is capable of temperature and vibration measuring and three-dimensional shape reconstruction, the operating method comprises the following steps:

S1, choose the length of umbilical cable according to the depth of the water. For example, choosing an umbilical cable with a length of 300 m, the length of the cable, communication optical cable, strain measuring optical fibers and temperature-measuring optical fibers are also 300 m. The wavelength of the laser used is 1550 nm, the pulse width is 32 ns, and the pump current is 500 mA; the distributed optical fiber strain interrogator can use BOTDA or φ-OTDR.

S2, connect the upper production control module and the lower production equipment with umbilical cable, in which the optical fiber is connected with a flange; the power cable is connected with industrial electricity;

S3, demodulate the data returned by the temperature measuring optical fibers in real time, and performs temperature compensation on the strain measuring optical fiber according to the demodulation results;

S4, obtain the bending conditions of the umbilical cable at different lengths by calculating the data of the three strain measuring optical fibers, reconstruct the shape of the umbilical cable, and obtain the correspondence between the cable length and depth;

S5, according to the correspondence between cable length and depth, map the temperature anomaly, vibration anomaly, and morphological anomaly to the corresponding depths for the controller to make decisions and take actions.

The above is only the preferred embodiments of the invention, and the protection scope of the invention is not limited to the above embodiments, and all the technical solutions under the idea of the invention belong to the protection scope of the invention. It should be pointed out that, for ordinary technicians skilled in the art, certain improvements and embellishments without deviating from the principle of the invention should be regarded as the protection scope of the invention.

The invention claimed is:

1. An underwater umbilical cable which is capable of temperature and vibration measuring and three-dimensional shape reconstruction, wherein the underwater umbilical cable is used to connect underwater equipment and aquatic equipment; the underwater umbilical cable comprises an outer sheath, armored steel wires, an inner sheath, a power cable, a communication optical cable, a steel pipe, three strain measuring optical fibers, three temperature measuring optical fibers, a distributed optical fiber strain interrogator, a distributed optical fiber temperature interrogator and a processor; the power cable is used to provide the working voltage required for the normal operation of the underwater equipment; the communication optical cable is used to establish a communication link between the underwater equipment and the aquatic equipment;

the outer sheath is concentrically sleeved on the outside of the inner sheath, a first gap with an annular cross-section is formed between the two, and a plurality of armored steel wires are evenly filled in the first gap;

the power cable, the communication optical cable, the steel pipe, strain measuring optical fibers, temperature measuring optical fibers are circumferentially distributed in the inner sheath; three strain measuring optical fibers and three temperature measuring optical fibers respectively constitute three detection optical fiber arrays, and the strain measuring optical fiber and the temperature measuring optical fiber of each detection optical fiber array are closely attached in the same cavity; the power cables, communication optical cables, and steel pipes are respectively arranged in a second gap among the detection optical fiber arrays; other spaces in the second gap are filled with fillers;

the distributed optical fiber strain interrogator is respectively connected with the three strain measuring optical fibers, and is used to process and analyze the reflected light of the three strain measuring optical fibers, locate the deformation point and deformation degree of the strain measuring optical fibers, reconstruct the shape of the underwater umbilical cable, and obtain correspondence between cable length and depth;

the distributed optical fiber temperature interrogator is used to process and analyze the reflected light obtained by the three temperature measuring optical fibers, and to monitor the temperature changes of the optical fibers in real time;

the processor is used to control the working state of the underwater equipment, and to display the temperature along the underwater umbilical cable and the three-dimensional shape of the underwater umbilical cable.

2. The underwater umbilical cable which is capable of temperature and vibration measuring and three-dimensional shape reconstruction in claim 1, wherein the three detection optical fiber arrays are separated by 120°.

3. The underwater umbilical cable which is capable of temperature and vibration measuring and three-dimensional shape reconstruction in claim 1, wherein the strain measuring optical fibers are three-in-one single-mode optical fibers, three single-core optical fibers are integrated in one cavity, and the three single-core optical fibers are separated by 120° respectively.

4. The underwater umbilical cable which is capable of temperature and vibration measuring and three-dimensional shape reconstruction in claim 1, wherein the temperature measuring optical fibers adopt loose sleeve single-mode optical fibers.

5. The underwater umbilical cable which is capable of temperature and vibration measuring and three-dimensional shape reconstruction in claim 1, wherein the underwater umbilical cable comprises storage device used to store the reflected light obtained by strain measuring optical fibers and temperature measuring optical fibers.

6. An operating method of underwater umbilical cable which is capable of temperature and vibration measuring and three-dimensional shape reconstruction in claim 1, the operating method comprises the following steps:

S1, choose the length of umbilical cable according to the depth of the water;

S2, connect the upper production control module and the lower production equipment with umbilical cable, in which the optical fiber is connected with a flange; the power cable is connected with industrial electricity;

S3, demodulate the data returned by the temperature measuring optical fibers in real time, and performs temperature compensation on the strain measuring optical fiber according to the demodulation results;

S4, obtain the bending conditions of the umbilical cable at different lengths by calculating the data of the three strain measuring optical fibers, reconstruct the shape of the umbilical cable, and obtain the correspondence between the cable length and depth;

S5, according to the correspondence between cable length and depth, map the temperature anomaly, vibration anomaly, and morphological anomaly to the corresponding depths.

* * * * *